United States Patent Office.

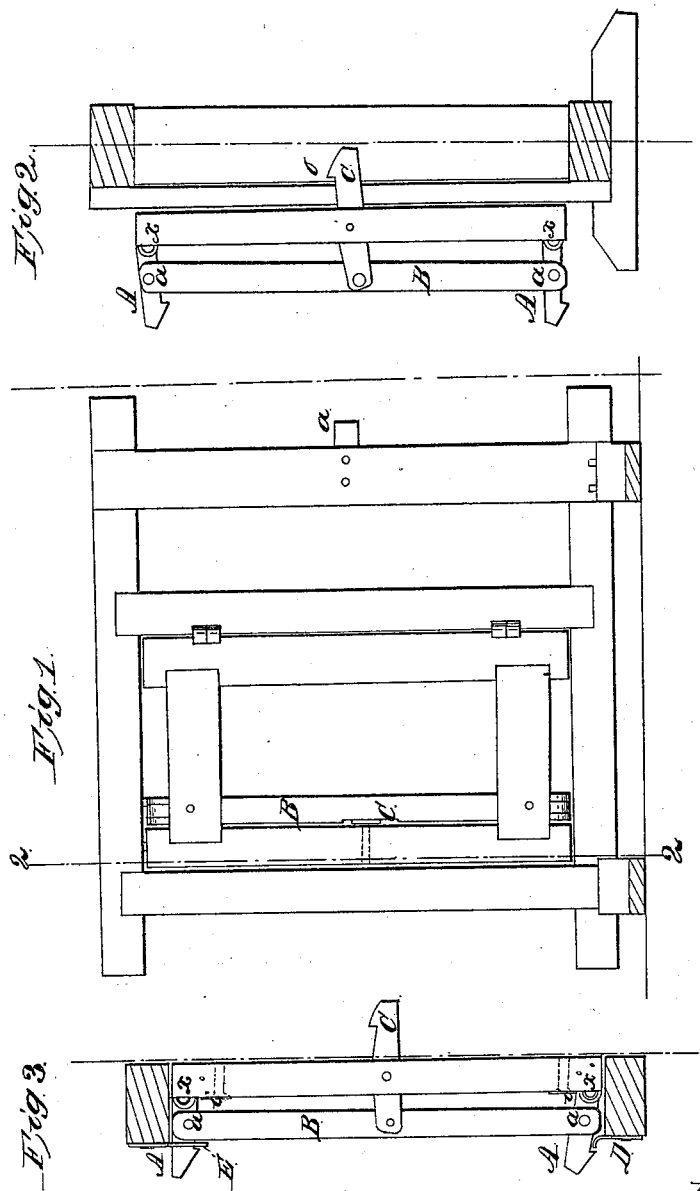

NELSON HORNADAY, OF WEST ELKTON, OHIO.

Letters Patent No. 70,846, dated November 12, 1867.

---

IMPROVED DOOR-FASTENING.

---

*The Schedule referred to in these Letters Patent and making part of the same.*

---

TO ALL WHOM IT MAY CONCERN:

Be it known that I, NELSON HORNADAY, of West Elkton, in Preble county, Ohio, have invented a new and useful Improvement in Door-Fastenings; and I do hereby declare that the following is a full and exact description thereof, reference being had to the accompanying drawings, and to the letters of reference marked thereon.

Figure I represents a front view of a door with my improved fastening.

Figure II represents an edge view of the door, with its fastenings, the former being opened and made fast to secure it in that position.

Figure III is a sectional view taken at the line 2 2 of Fig. I.

The two hinged hooks A A are secured to the inner side of the door-frame at $x\,x$, and these hooks are connected together by the bar or rod B by means of pivots $a\,a$. At the centre of bar B the hook C is connected, at one end, by a pivot-bolt, and also, at its centre, the hook C is pivoted to one of the upright frame-pieces of the door. Projecting from the sill or floor of the building there is a metal catch, D, and pendent from the upper edge of the doorway there is also a catch, E. The lower inner edge of hooks A A is provided with a shoulder, which will rest against the metal plates at $i\,i$, to prevent the hooks, with their connecting-bar B, from falling below a horizontal plane when the door stands unfastened.

When the door is swung open, the hook C (which also serves as a handle or thumb-piece by which to unlatch the door) will catch upon the fixed metal plate secured to the building at O. When the door is closed, the hooks A A fall upon the catches D E, and the weight of the bar B will serve to secure the hooks or retain them in contact with the catches, and, by depressing the outer end of hook C, the bar B will be elevated, causing the hooks A A to be raised from their catches, and when the door is swung open it will cause the hook C to fall over the catch O and secure the door in that position.

Having fully described my invention, and the manner of using the same, what I claim, and desire to secure by Letters Patent, is—

The combination of hooks A A C, bar B, with the catches D E O, when the several parts are constructed, arranged, and operating conjointly in the manner and for the purpose specified.

In testimony whereof I have hereunto set my hand this 18th day of March, A. D. 1867.

NELSON HORNADAY.

Witnesses:
H. P. K. PECK,
A. L. PECK.